US006947085B1

United States Patent
Booth, Jr.

(10) Patent No.: US 6,947,085 B1
(45) Date of Patent: Sep. 20, 2005

(54) CMOS SENSOR WITH DATA FLOW CONTROL

(75) Inventor: Lawrence A. Booth, Jr., Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 946 days.

(21) Appl. No.: 09/032,711

(22) Filed: Feb. 27, 1998

(51) Int. Cl.[7] ............................................. H04N 3/14
(52) U.S. Cl. ..................................................... 348/302
(58) Field of Search ................................ 348/272, 281, 348/282, 308, 312, 317, 390, 399.1, 552, 230, 231; 375/240.05, 240.07

(56) References Cited

U.S. PATENT DOCUMENTS

| | | | | | |
|---|---|---|---|---|---|
| 3,715,489 A | * | 2/1973 | Brown et al. | ............ | 348/390.1 |
| 4,539,598 A | * | 9/1985 | Dietrich et al. | ............. | 348/230 |
| 5,541,654 A | * | 7/1996 | Roberts | ...................... | 348/302 |
| 5,986,714 A | * | 11/1999 | Marino | ........................ | 348/390 |
| 6,314,140 B1 | * | 11/2001 | Shelby | ........................ | 348/401 |

\* cited by examiner

Primary Examiner—Wendy R. Garber
Assistant Examiner—Rashawn N. Tillery
(74) Attorney, Agent, or Firm—Blakely, Sokoloff, Taylor & Zafman LLP

(57) ABSTRACT

A method and apparatus to control data readout of a pixel array which converts light into electrical signals. A readout circuitry is coupled with the pixel array to read out the pixel array. A halt circuitry to halt the readout circuitry from reading out the pixel array when the halt circuitry receives a flow control signal is coupled with the readout circuitry. A sense circuitry sends a flow control signal to the halt circuitry when the sense circuitry senses an overload of data transmitted from the pixel array to an interface.

15 Claims, 7 Drawing Sheets

CMOS SENSOR WITH DATA FLOW CONTROL

BACKGROUND OF THE INVENTION (1) Field of the Invention

The present invention generally relates to a method and apparatus for an image sensor. In particular, the present invention relates to controlling a data flow from an image sensor to an interface.

(2) Background of the Invention

Complementary metal oxide semiconductor (herein CMOS) sensors have been of interest as replacements for charge-coupled devices (herein CCD) in imaging applications. CMOS sensors promise lower power and simpler system level design through fewer power supply voltages and higher functional integration. These factors contribute to lowering system cost while providing for a potential "camera on a chip." Such features are highly desirable. For example, in camcorders or digital cameras, the devices may be reduced to a size of a TV remote control while allowing higher resolution color images to be recorded for hours.

Typically, in a CMOS sensor device, a CMOS sensor would generate a high frame rate in comparison with a processing rate of a data processing circuitry which may be an internal circuitry of the CMOS sensor device or it may be external such as a computer. As an example, the CMOS sensor may be generating an output of about 30 frames per second. However, the data processing circuitry may be processing at a rate of only 10 frames per second. In this instance, a data overflow will result at the point of the data processing circuitry. One prior method involved designing the CMOS sensor such that the data flow rate from the CMOS sensor matched the processing rate of the processing circuitry. However, the disadvantage is that the CMOS sensor matched to one data processing circuitry may not be used with other data processing circuitries, which may have different data processing rates. In addition, a data processing circuitry may have to process data at several different processing rates dependent on system performance parameters which cannot be covered by a CMOS sensor with one data flow rate.

Another prior method involved buffering the data from the CMOS sensor into a temporary data storage such as random access memory (herein RAM) in contemplation of various data processing rates of the data processing circuitries. From the RAM, a data processing circuitry accessed data at its data processing rate. However, this method assumes that the rate of data output from the RAM will be high enough such that the rate of data input to the RAM will not overload the RAM. Thus, the method is limited to a small range of data output processing rate. Further, in this method, large banks of RAMs are required. However, RAMs are expensive and increases the overall cost of a system using CMOS sensor, making it undesirable in a highly competitive environment such as the camera market. Yet, another method involved discarding the excess data flow from the CMOS sensor when the data processing circuitry became overloaded with datum. However, in portable devices such as a digital camera or digital camcorder, precious battery power is wasted generating unnecessary datum shortening the operating time of the devices.

Accordingly, what is needed is a method and apparatus for controlling the data transfer rate of a CMOS sensor such that the sensor may be used with a variety of data processing circuitries with various data processing rates and further does not unnecessarily waste electrical power.

SUMMARY OF THE INVENTION

The present invention provides for controlling data readout of a pixel array which converts light into electrical signals. A readout circuitry is coupled with the pixel array to read out the pixel array. A halt circuitry to halt the readout circuitry from reading out the pixel array when the halt circuitry receives a flow control signal is coupled with the readout circuitry. A sense circuitry sends a flow control signal to the halt circuitry when the sense circuitry senses an overload of data transmitted from the pixel array to an interface.

BRIEF DESCRIPTION OF THE DRAWINGS

The features, aspects, and advantages of the present invention will become more fully apparent from the following detailed description, appended claims, and accompanying drawings in which:

DETAILED DESCRIPTION OF THE INVENTION

With reference to the figures, exemplary embodiments of the invention will now be described. The exemplary embodiments are described primarily with reference to block diagrams, circuits, and state diagrams illustrating apparatus elements, unless otherwise noted and depending upon the implementation, the apparatus elements or portions thereof may be configured in hardware, software, firmware, or combinations thereof. It should be appreciated that not all components necessary for a complete implementation of a practical system are described in full detail. Rather, only those components necessary for a thorough understanding of the invention are illustrated and described. Furthermore, components which are either conventional or may be readily designed and fabricated in accordance with the teachings provided herein are not described in detail.

Figure 1:
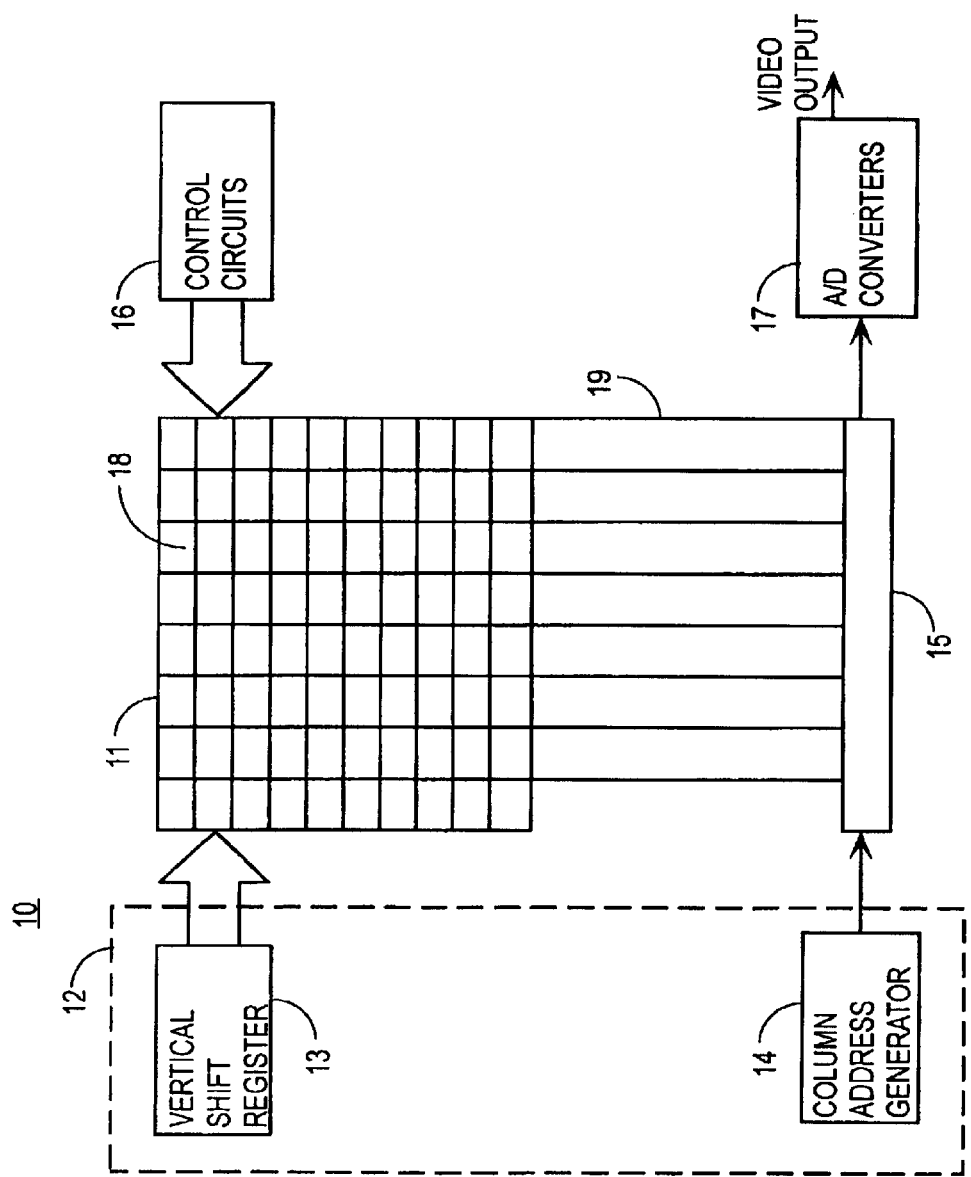
FIG. 1 illustrates an exemplary CMOS image sensor device.

FIG. 1 illustrates an exemplary image sensor 10. Turning to pixel array 11, the pixel array 11 has a large number of photocells or pixels 18 that respond to incident light falling on the array 11 where the light has captured an image of a scene. Each pixel 18 responds to the incident light by converting the light into an electrical signal. As a result, the combined pixels 18 in the array 11 generate an electrical version of the image of the scene captured by the light. Each pixel 18 also has a corresponding storage capacitor to store the electrical signal until it is read out by a readout circuitry 12. In this instance the electrical signals stored are in analog format. An example of a readout circuitry 12 may comprise vertical shift register 13 and column address generator 14. Vertical shift register 13 driven by a clock provide signals for the read out of the pixel array 11 on a row-by-row basis which is further described with respect to FIG. 2. The read out row of electrical signals are transmitted through bitlines 19 which are then sent to a holding array 15 to be temporarily held. Column address generator 14 generates column addresses for the read out bits in the holding array 15 which are sent to an analog/digital (herein A/D) converter 17 to be converted from analog to digital signals which are then outputted as digital video signals. Control circuits 16 control the operation of the individual pixels which are now described.

Figure 2:
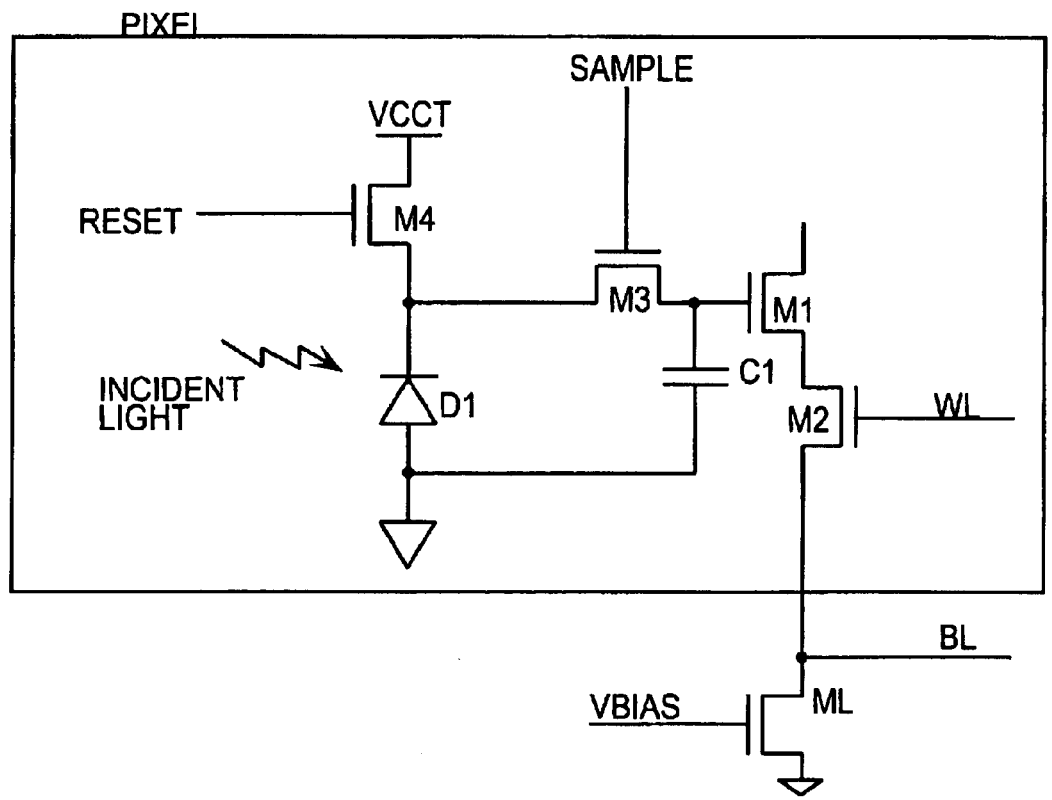
FIG. 2 illustrates an exemplary pixel schematic.

FIG. 2 illustrates an exemplary pixel schematic. Initially, RESET signal provided by control circuits 16 of FIG. 1 is asserted on transistor M4 pre-charging a photodiode D1 to approximately reset voltage ($V_{CCT}$). Coincidentally, SAMPLE signal also provided by control circuits 16 is asserted on transistor M3 allowing the storage capacitor C1 to store the charge generated by photodiode D1. With the RESET signal de-asserted, the incident light falling on the photodiode D1 dictates the electrical current generated by photodiode D1. Specifically, incident light falling on photodiode D1 generates electron hole pairs which create a electrical current in photodiode D1 in accordance with well known photoelectric principles. The current is formed into analog voltage by the capacitor C1. The value of the voltage is a function of light intensity and time since pre-charge, and the time is referred to as integration time. When SAMPLE signal is deasserted, transistor $M_3$ is turned off isolating storage capacitor C1 from photodiode D1 and causes capacitor C1 to capture the sampled analog voltage. Once stored, vertical shift register 13 of read out circuitry 12 as illustrated in FIG. 1 reads out the pixel array 11 on a row-by-row basis which is further described with respect to FIG. 4. By asserting WORDLINE WL an enabled bit of vertical shift register 13 turns on transistor M2 of the individual pixels in a selected row allowing the sampled analog voltage stored in the selected storage capacitors C1 to be asserted across corresponding load devices ML which drive the bitline 19 of each pixels in the row to sent the sampled analog voltage to the holding array 15 as illustrated in FIG. 1.

Figure 3A:
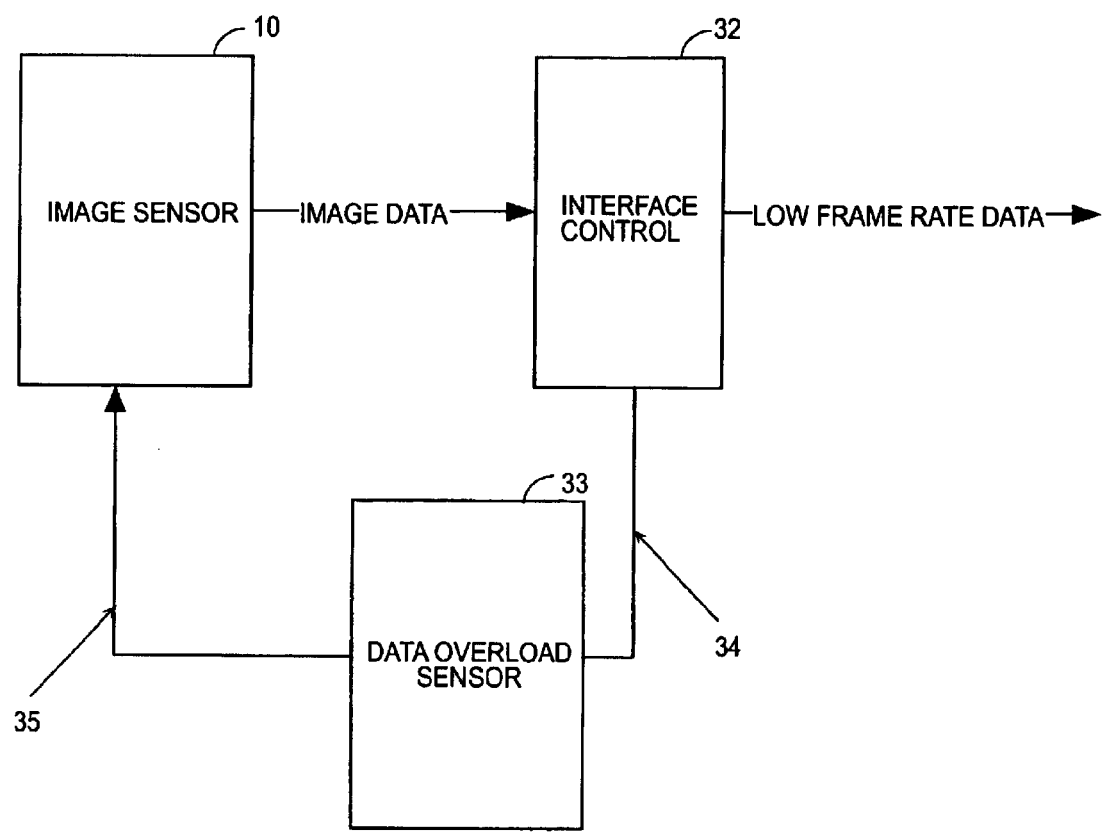
FIGS. 3a–c illustrate an exemplary embodiment according to the present invention.

FIG. 3a illustrates an exemplary embodiment of the present invention. Image sensor 10 is coupled to an interface control 32 which may be internal or external to the image sensor device. The image sensor 10 transmits video signals at a high frame rate, in this example, 30 frames per second. The interface control 32, which may include a buffer memory, receives the transmitted video signals and interfaces with a data processing circuitry to transmit at a frame rate corresponding to the data processing circuitry. In this example, the interface frame rate may be 10 frames per second. When the data overload sensor 33 detects data overflow from sense line 34, a flow control signal 35 is sent to the image sensor 10 to halt the transmission of the video signals.

Figure 3B:
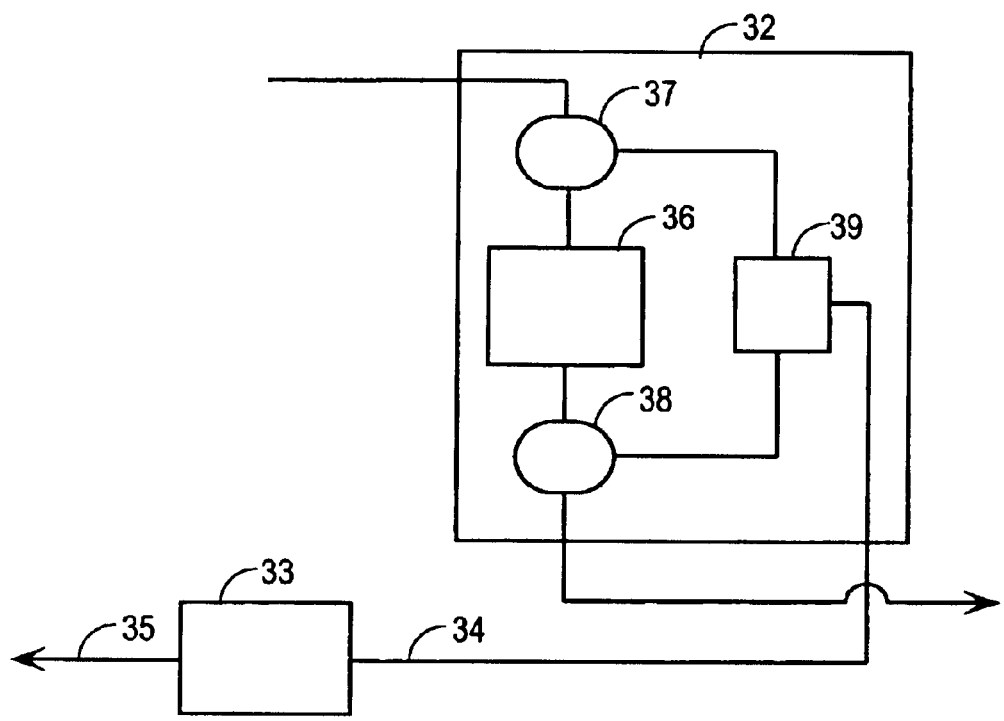

FIG. 3b illustrates an example of an interface control 32 using a buffer memory 36 to manage the data rate arriving and leaving the interface control 32. A common buffer memory implementation employs a First In First Out (herein FIFO) memory architecture. As each datum arrives at the interface control 32, it passes through a write counter 37 and is stored in the buffer memory 36. As each datum leaves the interface, it is read from the buffer memory 36 and passes through a read counter 38 to a data processing circuitry. The read storage location can be used to store another arriving datum. The addressing for this buffer memory storage follows a logical sequence because the memory is a FIFO architecture. When all the storage locations in the buffer memory have been used, the buffer is full. This can be determined through the data overload sensor 33 that examines the write counter 37 and the read counter 38, knowing the logical sequence employed. For example, if the number of write counter exceeds the number of read counter by the amount of storage location in the buffer memory 36, the buffer is full. The data overload sensor 33 senses the full buffer memory through a comparing circuit 39.

Figure 3C:
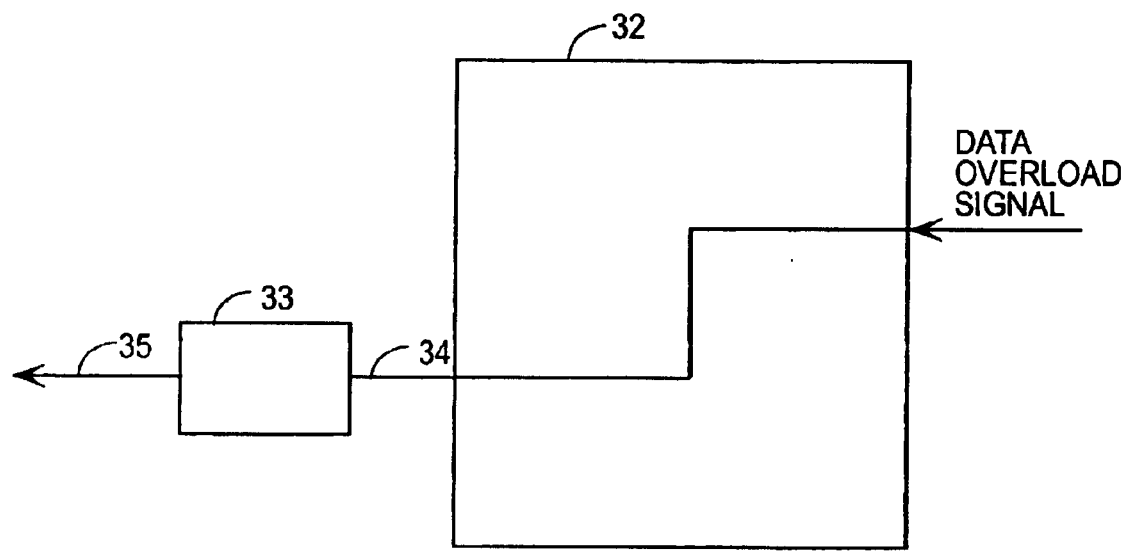

FIG. 3c illustrates an interface control 32 that is not utilizing a buffer memory. In this instance, the interface control 32 may establish a protocol with the data processing circuitry when the datum is transmitted. When data overflow results at the point of the data processing circuitry, a data overload signal is sent to the interface control 32 by the data processing circuitry. This system of protocol is generally known in the art. The data overflow signal is sensed by the data overload sensor 33. However the present invention is not limited to the two exemplary embodiments described above and one skilled in the art will recognize that other embodiments are feasible using the present invention. In any event, when data overload sensor 33 senses data overflow from the interface control 32, a flow control signal 35 is sent to the image sensor 10 to halt the sensor from transmitting further video signals. This halting of the image sensor 10 is now described.

Figure 4:
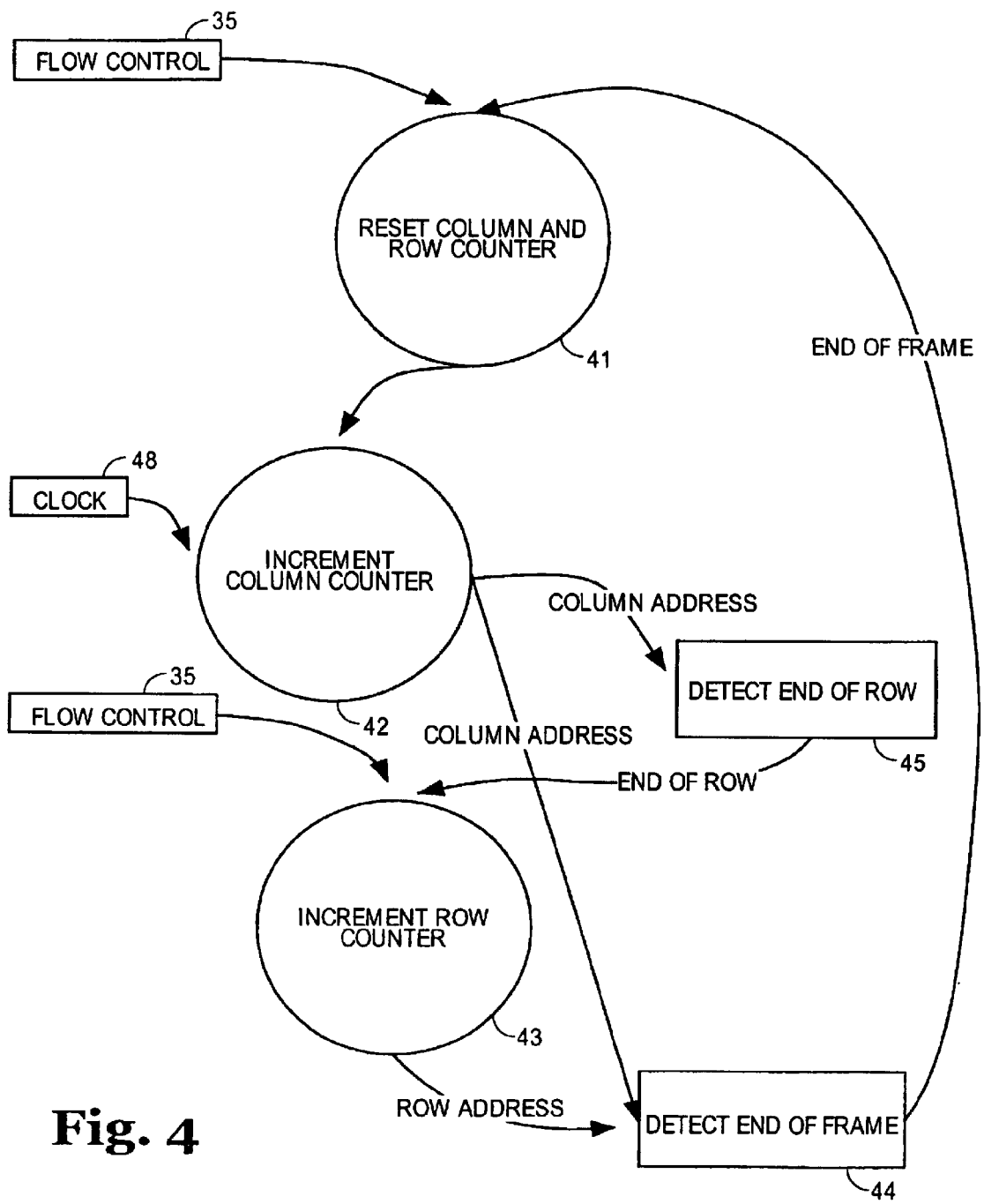
FIG. 4 illustrates an exemplary state diagram illustrating an operation of the read out circuitry.

FIG. 4 is an exemplary state diagram illustrating one operation of the readout circuitry 12 as illustrated in FIG. 1. Instead of shift registers, the state diagram is illustrated in terms of increment counters. This is to illustrate that the present invention is not limited to shift registers but includes other components that can perform equivalent functions such as a counter with a decoder. In FIG. 4, three states are illustrated: reset column and row counter 41, increment column counter 42, and increment row counter 43. The operation of the states are now described. Once the last pixel in the pixel array 11 has been read, detect end of frame 44 generates an end-of-frame signal which resets the column and the row counter 41. In accordance with the principles of the invention, once the end of frame signal is generated, if a flow control signal 35 is active indicating a data overflow at the interface control 32, the reset of column and row counter 41 is halted from resetting the column and row counter. Because the row counter is synchronized with WORDLINE WL of FIG. 2 to read out the pixels on a row by row basis, halting the row counter halts the enabling of WORDLINE WL until the flow control signal 35 has been deactivated.

Further into the operation, the column counter 43 is incremented until an end of row 45 is detected. This causes the incrementation of row counter 43 to enable the WORDLINE WL of the next row in the pixel array 11. However, if the flow control signal 35 is active, the increment of the row counter 43 is halted. As described above, since the row counter is synchronized with the WORDLINE WL which allows a read out of a row in the pixel array 11, the halting of the row counter also halts the read out. As illustrated in the flow control state diagram, by halting the reset of the column and row counter or the increment of the row counter according to the flow control signal 35 from the data overload sensor 33, the data transfer rate of the image sensor is matched with the data processing rate of the data processing circuitry. As a result, additional buffers such as RAMS dependent on the processing rate of the data processing circuitry are no longer necessary. In addition, power is conserved by transmitting datum at the rate that can be processed by the data processing circuitry and not at a higher transfer rate that results in discarding the excess datum.

Figure 5:
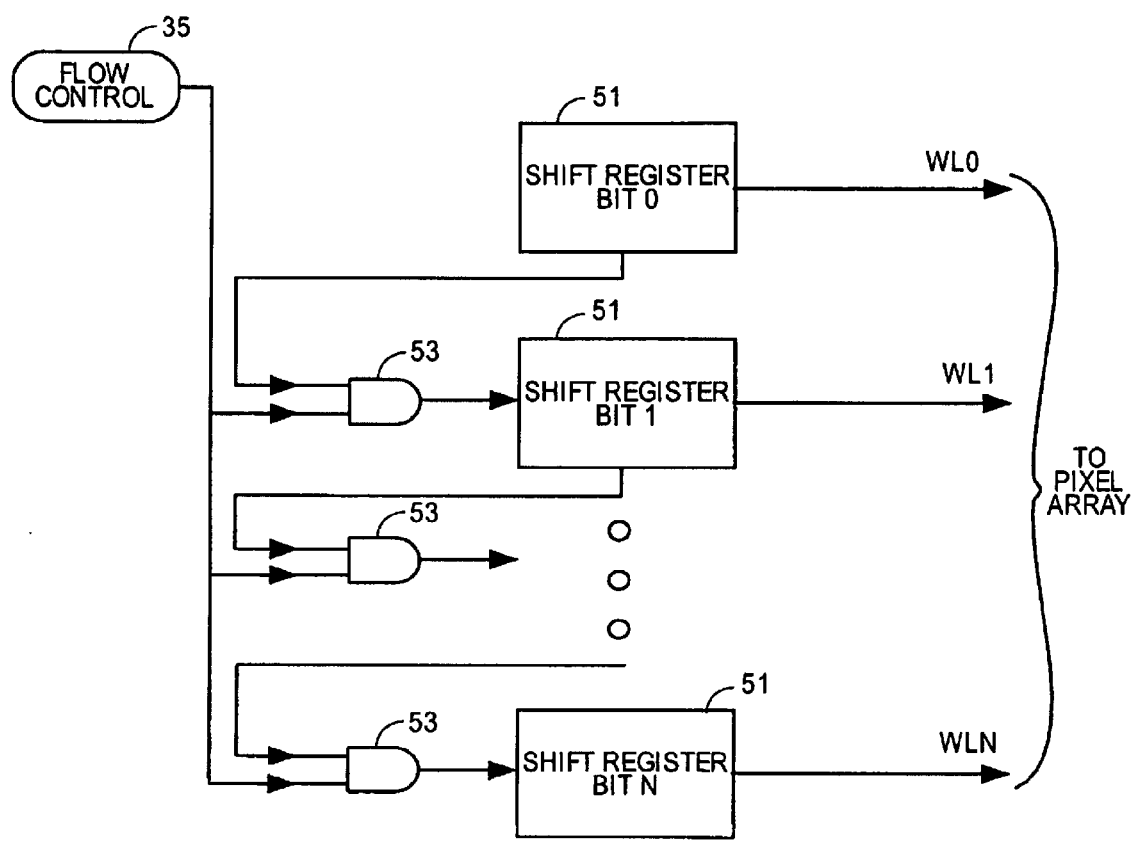
FIG. 5 illustrates an exemplary circuit of the present invention.

FIG. 5 illustrates an exemplary circuit of the present invention. As illustrated vertical shift register 13 comprises N-bits 51 corresponding to the number of rows in the pixel array 11. Each shift register bit 51 controls one row. As an example, shift register bit 0 may control WORDLINE row 0. Shift register bit 1 may control WORDLINE row 1, and etc. The output of each shift register bit is coupled with flow control signal 35 through a corresponding AND gate 53. The AND gates 53 controls the shift of the shift register bits 51. When a flow control signal 35 is asserted, the shift of an enabling register bit 51 is halted to prevent asserting the WORDLINE WL on the row of the pixel array 11 to be enabled. The assertion of the WORDLINE WL is halted until the flow control signal 35 has been deactivated.

Figure 6:
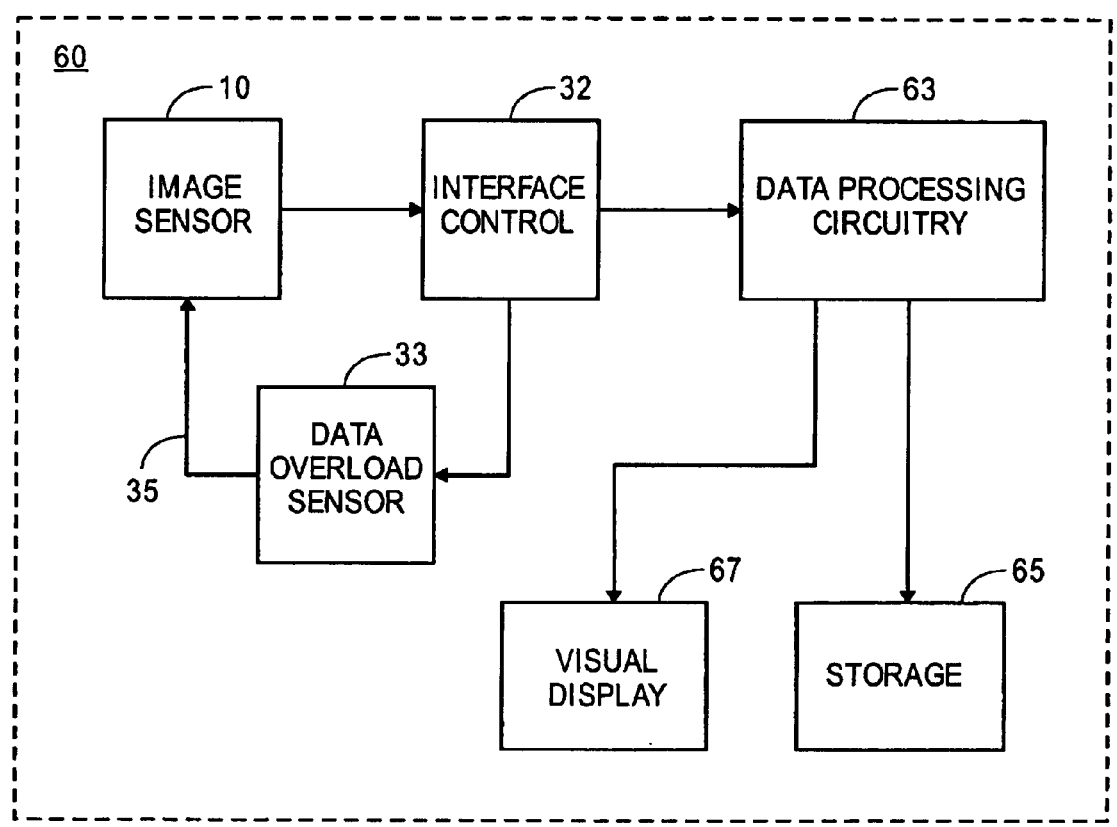
FIG. 6 illustrates an exemplary system using the present invention.

FIG. 6 illustrates a system 60 that utilizes the present invention. The system 60 may be, for example, a digital camera or a camcorder or any system that is related to image processing. As shown in the figure, system 60 incorporating the present invention may include a image sensor 10 which is coupled to an interface control 32. A data overload sensor 33 senses the data overload from the interface control 32 and sends a flow control signal 35 to the image sensor 10 to control the flow of data to the interface control 32. Specific descriptions regarding the relationships between the image sensor 10, interface control 32 and data overload sensor 33 have been described with reference to FIGS. 3–5. The system 60 may include other components such as data processing circuitry 63 to process the received data from image sensor 10. The system 60 may include storage device 65 which may be electrical, such as RAM, or magnetic, such as hard drives, magnetic tapes, or optical disks. The system 60 may include visual device 67 such as a monitor. All the mentioned components or devices may be incorporated with the image sensor 10, by way of example, digital camera or camcorder, or may be external to the image sensor, for example, surveillance camera.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. An apparatus comprising:
    a pixel array to convert light into electrical signals and to store said electrical signals;
    circuitry for reading out said pixel array, said readout circuitry coupled to said pixel array;
    circuitry to sense overload of data transmitted from said pixel array to an interface and generating a flow control signal upon sensing data overload; and
    circuitry to halt said readout circuitry from reading out said pixel array, said halting circuitry coupled with readout circuitry and further coupled to receive said flow control signal wherein said halting circuitry halting said readout circuitry on receipt of said flow control signal until said flow control signal is deactivated by said sense circuitry.

2. The apparatus in claim 1, wherein said readout circuitry is a shift register having a plurality of bits corresponding to a number of rows of said pixel array, each bit being coupled with a corresponding row of said pixel array wherein an enabled bit from said plurality of bits enables the readout of said corresponding row of said pixel array.

3. The apparatus in claim 2, wherein said halting circuitry is a plurality of AND gates wherein each of said AND gates having an input to receive said flow control signal and an output coupled with a corresponding bit of said plurality of bits wherein said AND gate halting an enabling of a corresponding bit on receipt of said flow control signal until said flow control signal is deactivated.

4. The apparatus in claim 1, wherein said interface further having a buffer memory and said sense circuitry sensing said data overload by examining said buffer memory and generating said flow control signal if said buffer memory is full.

5. A method to control data transfer rate of an image sensor having a pixel array comprising the steps of:
    (a) providing a circuitry for reading out said pixel array, said readout circuitry coupled to said pixel array;
    (b) providing a circuitry to sense overload of data transmitted from said pixel array to an interface and generating a flow control signal upon sensing data overload; and
    (c) providing a circuitry to halt said readout circuitry from reading out said pixel array, said halting circuitry coupled with readout circuitry and further coupled to receive said flow control signal wherein said halting circuitry halting said readout circuitry on receipt of said flow control signal until said flow control signal is deactivated by said sense circuitry.

6. The method according to claim 5, wherein said readout circuitry of step (a) performing the step of enabling the readout of said pixel array on a row-by-row basis.

7. The method according to claim 5, wherein said halting circuitry of step (c) performing the steps comprising:
    (a) if said flow control signal is not received, allowing said readout circuitry to enable said pixel array to read out data; and
    (b) if said flow control signal is received, preventing said readout circuitry from enabling said pixel array to read out data.

8. The method according to claim 5, wherein said sensing circuitry of step (b) performing the steps comprising:
    (a) sensing for a data overload by examining a buffer memory of said interface; and
    (b) if said buffer memory is full, transmitting said flow control signal to said halting circuitry.

9. The method according to claim 5, wherein said sensing circuitry of step (b) performing the steps comprising:
    (a) sensing for a data overload signal received by said interface according to a protocol between said interface and a data processing circuitry; and
    (b) if said data overload signal is sensed, transmitting said flow control signal to said halting circuitry.

10. A method to control data transfer rate of an image sensor having a pixel array comprising the steps of:
    (a) detecting end of frame of said pixel array;
    (b) if a flow control signal is detected halting a reset of a readout circuitry coupled with said pixel array such that no data is read out from said pixel array;
    (c) if a flow control signal is not detected resetting said readout circuitry and enabling a row in said pixel array to readout a row of data;
    (d) if said flow control signal is detected halting an increment of said readout circuitry wherein an enabling of another row is halted such that no data is read out from said pixel array;
    (e) if said flow control signal is not detected incrementing said readout circuitry wherein said another row is enabled such that another row of data in said pixel array is readout;
    (f) if said end of frame is not detected repeating steps (d) and (e).

11. A system comprising:
    a pixel array to convert light into electrical signals and to store said electrical signals;
    circuitry for reading out said pixel array, said readout circuitry coupled to said pixel array;
    an interface to receive said readout from said pixel array;
    circuitry to sense overload of data transmitted from said pixel array to said interface and generating a flow control signal upon sensing data overload; and
    circuitry to halt said readout circuitry from reading out said pixel array, said halting circuitry coupled with readout circuitry and further coupled to receive said flow control signal wherein said halting circuitry halting said readout circuitry on receipt of said flow control signal until said flow control signal is deactivated by said sense circuitry.

12. A system of claim 11 further comprising:

a data processing circuitry to process data received from said interface.

13. The system of claim 12 further comprising:

a storage device coupled with said data processing circuitry to store a processed data.

14. The system according to claim 12 further comprising:

a visual display coupled with said data processing circuitry to display a process data.

15. The apparatus of claim 1, wherein said circuitry to sense data overload generates a flow control signal upon receiving a data overload signal from a data processing circuit.

* * * * *